(12) United States Patent
Kadav et al.

(10) Patent No.: US 12,453,896 B2
(45) Date of Patent: Oct. 28, 2025

(54) CAMERA DEVICE FOR WORKOUT

(71) Applicant: Tonal Systems, Inc., San Francisco, CA (US)

(72) Inventors: Asim Kadav, Mountain View, CA (US); Rajiv Bhan, Mountain View, CA (US); Ryan LaFrance, San Francisco, CA (US); Bryan James, Menlo Park, CA (US); Aly E. Orady, San Francisco, CA (US); Brandt Belson, San Francisco, CA (US); Gabriel Peal, San Francisco, CA (US); Thomas Kroman Watt, San Francisco, CA (US); Ivan Savytskyi, Mississauga (CA)

(73) Assignee: Tonal Systems, Inc., San Francisco, CA (US)

( * ) Notice: Subject to any disclaimer, the term of this patent is extended or adjusted under 35 U.S.C. 154(b) by 154 days.

(21) Appl. No.: 17/968,110

(22) Filed: Oct. 18, 2022

(65) Prior Publication Data

US 2023/0128118 A1    Apr. 27, 2023

Related U.S. Application Data

(60) Provisional application No. 63/257,230, filed on Oct. 19, 2021.

(51) Int. Cl.
*A63B 24/00* (2006.01)
*A63B 21/00* (2006.01)

(52) U.S. Cl.
CPC ........ *A63B 24/0062* (2013.01); *A63B 21/153* (2013.01); *A63B 2220/05* (2013.01); *A63B 2220/20* (2013.01); *A63B 2220/806* (2013.01); *A63B 2225/50* (2013.01)

(58) Field of Classification Search
CPC .............. A63B 24/0062; A63B 21/153; A63B 2220/05; A63B 2220/20; A63B 2220/806; A63B 2225/50; A63B 23/03541; A63B 71/0622; A63B 21/008; A63B 21/0085; A63B 21/012; A63B 21/02; A63B 21/4035; A63B 2071/063; A63B 2071/0638; A63B 2220/58; A63B 2220/805; A63B 21/005; A63B 21/0058; A63B 2225/20
See application file for complete search history.

(56) References Cited

U.S. PATENT DOCUMENTS

| | | | |
|---|---|---|---|
| 11,000,735 B2 * | 5/2021 | Orady | A63B 24/0059 |
| 11,806,581 B2 * | 11/2023 | Orady | A63B 71/0622 |
| 2017/0337033 A1 * | 11/2017 | Duyan | G06F 1/163 |
| 2018/0226146 A1 * | 8/2018 | Aragones | G16H 20/60 |

(Continued)

*Primary Examiner* — Andrew M Kobylarz
(74) *Attorney, Agent, or Firm* — Van Pelt, Yi & James LLP

(57) ABSTRACT

An exercise machine includes a cable. It further includes an interface to a moveable camera device coupled with the exercise machine. It further includes a processor configured to receive a cable-based measurement associated with an exercise performed by a user. The processor is further configured to receive, from the moveable camera device, video information associated with the exercise. The processor is further configured to provide a workout determination based at least in part on both the cable-based measurement and the video information received from the moveable camera device.

9 Claims, 4 Drawing Sheets

(56) References Cited

U.S. PATENT DOCUMENTS

| | | |
|---|---|---|
| 2020/0047027 A1 | 2/2020 | Ward |
| 2020/0047030 A1 | 2/2020 | Ward |
| 2020/0047053 A1 | 2/2020 | Ward |
| 2020/0047054 A1 | 2/2020 | Ward |
| 2020/0047055 A1 | 2/2020 | Ward |
| 2020/0054929 A1 | 2/2020 | Ward |
| 2021/0291021 A1* | 9/2021 | Orady .................... G16H 20/30 |
| 2021/0394011 A1* | 12/2021 | Neuhaus ............ A63B 71/0622 |
| 2022/0296966 A1* | 9/2022 | Asikainen .............. G16H 20/30 |
| 2024/0058684 A1* | 2/2024 | Beom ................. A63B 24/0062 |
| 2024/0123288 A1* | 4/2024 | Barbalinardo ....... G06V 10/764 |

* cited by examiner

CAMERA DEVICE FOR WORKOUT

CROSS REFERENCE TO OTHER APPLICATIONS

This application claims priority to U.S. Provisional Patent Application No. 63/257,230 entitled CAMERA DEVICE FOR WORKOUT filed Oct. 19, 2021 which is incorporated herein by reference for all purposes.

BACKGROUND OF THE INVENTION

When performing exercise, it may be beneficial to utilize information about the exercise captured from multiple sources. However, coordinating the information from disparate sources to provide insight about the exercise can be challenging.

BRIEF DESCRIPTION OF THE DRAWINGS

Various embodiments of the invention are disclosed in the following detailed description and the accompanying drawings.

DETAILED DESCRIPTION

Figure 1A:
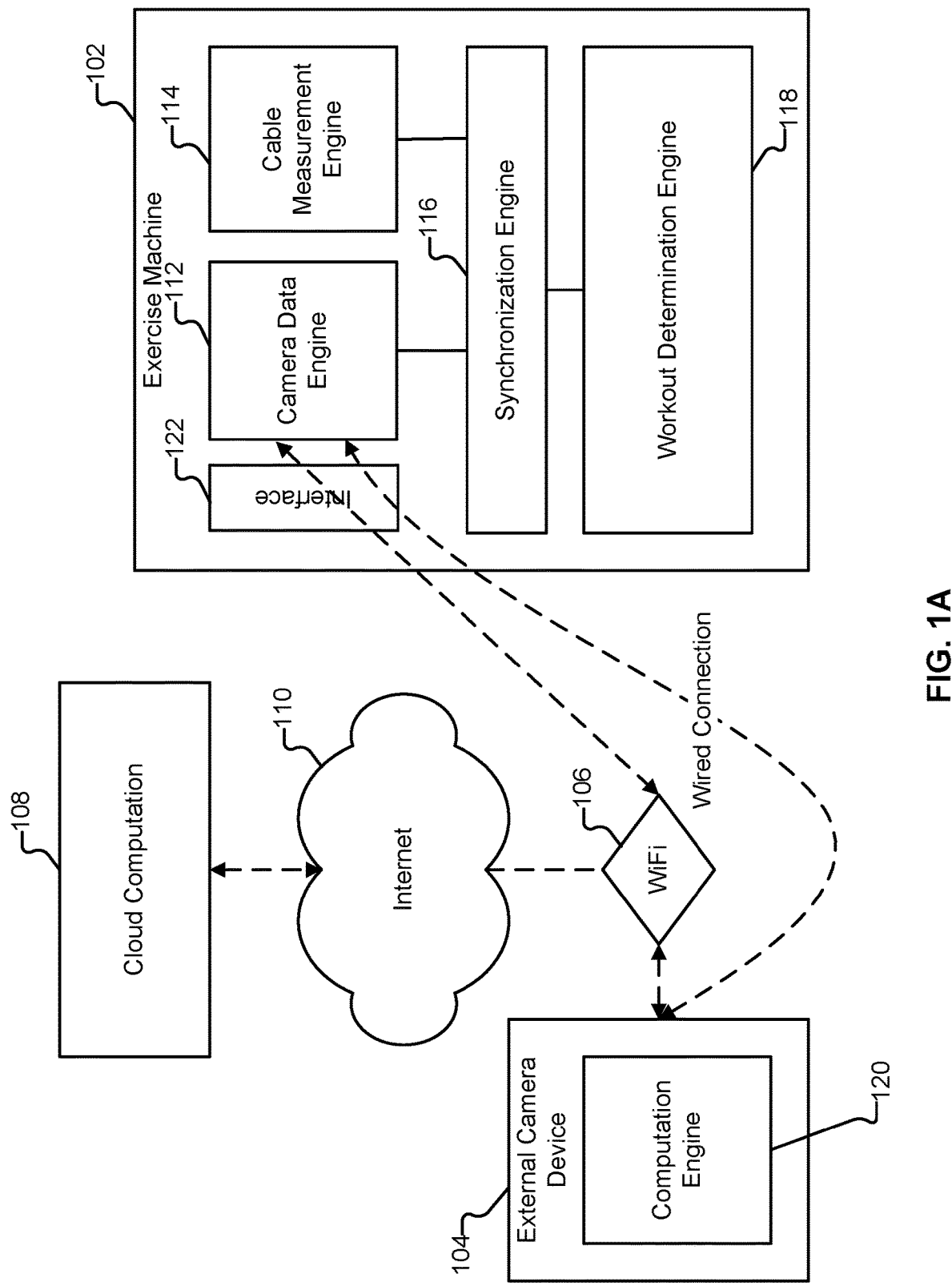
FIG. 1A illustrates an embodiment of a system for integrating and coordinating an external camera device and a cable-based exercise machine.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

From an exercise perspective, it would be beneficial, for various purposes (e.g., form feedback, repetition counting, struggle detection, fatigue detection, etc.), to capture video data of performance of an exercise. While some exercise machines include embedded cameras, there may be limitations. For example, camera technology evolves quickly, and embedded cameras that are difficult to replace may quickly become obsolete and of not sufficient quality in a matter of years with respect to performance (e.g., frame rate, resolution, field of view, etc.), especially in comparison with the lifetime of the exercise machine, which may be upwards of a decade. Further, a fixed embedded camera limits the types of perspectives that may be captured. For example, if a camera is embedded at a top of an exercise machine, then given its field of view, it may not be able to capture the user's lower body, only their upper body.

Described herein are techniques for integrating an external camera device with a cable-based exercise machine. The techniques described herein include embodiments of a framework or architecture for integrating a moveable camera device (such as that on a mobile device or of a standalone external camera device) with a cable-based exercise machine (e.g., cable-based strength trainer). As will be described in further detail below, embodiments of the external camera integration techniques described herein include techniques for efficiently splitting computation between the external camera device and trainer to ensure efficient communication, as well as batching of communications between an external camera device and the trainer to minimize communication overheads.

For illustrative purposes, examples involving improved form feedback in a cable machine using a moveable camera are described. While embodiments of integration of an external camera device with a cable-based exercise machine are described in the context of form feedback for illustrative purposes, the techniques described herein may be variously adapted for various other applications, such as repetition counting, assessments, determining ROM (range of motion), determining flexibility, struggle detection, fatigue detection, and other use cases.

The use of a moveable camera allows for improved form feedback, in which video-based information is combined with cable-based information to provide finer-grained positional information about a user. With finer-grained positional information, various benefits may be provided, such as more advanced feedback on form, avoidance of injuries, improved muscle utilization, as well as guidance on movements that are performed without using the cables of the trainer. For example, with respect to form feedback, a moveable camera positioned to the side of the user may be used to obtain key positions of large body joints that allow form feedback for injury prevention, muscle utilization, and off-device moves.

As described above, in various embodiments, the techniques described herein include those for determining how to efficiently split computation between the trainer and moveable external camera device to ensure efficient communication, as well as determining how to batch communication between the moveable external camera device and the trainer to minimize communications overhead. Techniques for coordinating interaction and communication between a moveable camera device with a trainer include embodiments of splitting computation/processing between the camera device and trainer to reduce CPU utilization on the trainer. For example, in the context of form feedback, compute intensive user joint key-points are generated on the external camera device, where processing of these keypoints is then performed on the trainer. Techniques for reducing communications overheads are also described herein. As one example, described herein are embodiments of techniques for batching of key-points sent to the trainer at different workout phases to reduce communication overhead, without affecting the accuracy of real time form intelligence. Embodiments of techniques for improving robustness are also described herein, including correction of collected noisy key-points using smoothing, as well as embodiments of interpolation techniques.

Form feedback is an example type of workout determination that may be made using a combination of vision-based and cable-based data. Various workout determinations may be made using vision-based and cable-based data. For example, the workout determinations may be made by training and deploying machine learning models on the exercise machine using a combination of different models for different types of form feedback. As one example of output that may be provided using the techniques described herein, time stamps of incorrect form detected in a video stream captured by a moveable camera device are detected, where a video alert is sent to the user for form improvement.

The ability to integrate the trainer with an external device such as a mobile phone has further benefits with respect to enhancing or augmenting the capabilities of the trainer. For example, phone cameras improve year after year, and evolve much more quickly than a trainer, which may last over a decade. In this way, the imaging capabilities are automatically upgraded each time a user obtains a new phone, without relying on updating the trainer itself or purchasing a new trainer.

Another example benefit to integrating an exercise machine with an external camera device is the augmenting of computational power of the trainer. For example, the computational power of the trainer may be fixed for the life of the trainer. By using the framework described herein, in which a trainer integrates with an external device and computation is distributed across the trainer and the external device(s), the computing power of the external device such as a mobile phone (which increases year after year) may be leveraged to perform functions that may be difficult for the trainer to perform on its own, especially as more streams of information (e.g., camera feeds, sensor data, etc.) are received.

As will be described in further detail below, using the framework described herein, the resources of the external camera device, whether its camera, GPU (graphics processing unit), and/or processor power may be leveraged to augment the capabilities of the exercise machine. In this way, by distributing compute so that it occurs on the camera device external to the system, a modern camera and computing capabilities are brought to a trainer device which may, over time, become limited in terms of its available computational capacity and the types of processing it may be able to perform. Rather, the use of external camera devices allows for improved camera quality and increases in the amount of data collected over time, even if the trainer's hardware capabilities are surpassed.

FIG. 1A illustrates an embodiment of a system for integrating and coordinating a moveable external camera device and a cable-based exercise machine. An external camera device may be taken advantage of to capture video data of a user while they are working out in order to, for example, provide them more advanced form feedback about the moves that they are performing (e.g., whether they are hinging at the hips, or their knees are coming too far forward over their feet, whether they are keeping their back straight, etc.). The captured video information augments the cable-based measurements collected by the exercise machine, allowing for finer-grained positional information about the user. In various embodiments, the video information from the external camera device is used to help improve the user's performance, prevent or avoid injury, improve muscle utilization, and also facilitate visual display of another view of what the user is doing while they are exercising. The captured video information also allows determination of positional information of the user when they are performing off-trainer moves (e.g., moves that do not involve using the cables of the exercise machine, such as pushups, sit ups, yoga moves, etc.). In some embodiments, computer vision is run on the captured video data to perform pose estimation, which in some embodiments includes determining a skeletal structure of the user. Various angles may then be measured to determine correct or incorrect form. As another example, in some embodiments, the exercise machine includes a screen or display. The display may be configured to show a view of the mobile camera, which the user has set up to their side.

In this example, exercise machine 102 is a cable-based exercise machine, such as a cable-based strength trainer. As one example, the trainer is a digital strength trainer. The following are embodiments of a digital strength trainer.

In some embodiments, a digital strength trainer uses electricity to generate tension/resistance. Examples of electronic resistance include using an electromagnetic field to generate tension/resistance, using an electronic motor to generate tension/resistance, and using a three-phase brushless direct-current (BLDC) motor to generate tension/resistance. In various embodiments, the external camera device integration techniques, as well as the form detection and feedback techniques described herein, may be variously adapted to accommodate other types of exercise machines using different types of load elements without limitation, such as exercise machines based on pneumatic cylinders, springs, weights, flexing nylon rods, elastics, pneumatics, hydraulics, and/or friction.

Such a digital strength trainer using electricity to generate tension/resistance is also versatile by way of using dynamic resistance, such that tension/resistance may be changed nearly instantaneously. When tension is coupled to position of a user against their range of motion, the digital strength trainer may apply arbitrary applied tension curves, both in terms of position and in terms of phase of the movement: concentric, eccentric, and/or isometric. Furthermore, the shape of these curves may be changed continuously and/or in response to events; the tension may be controlled continuously as a function of a number of internal and external variables including position and phase, and the resulting applied tension curve may be pre-determined and/or adjusted continuously in real time.

Digital Strength Trainer Overview

Figure 1B:
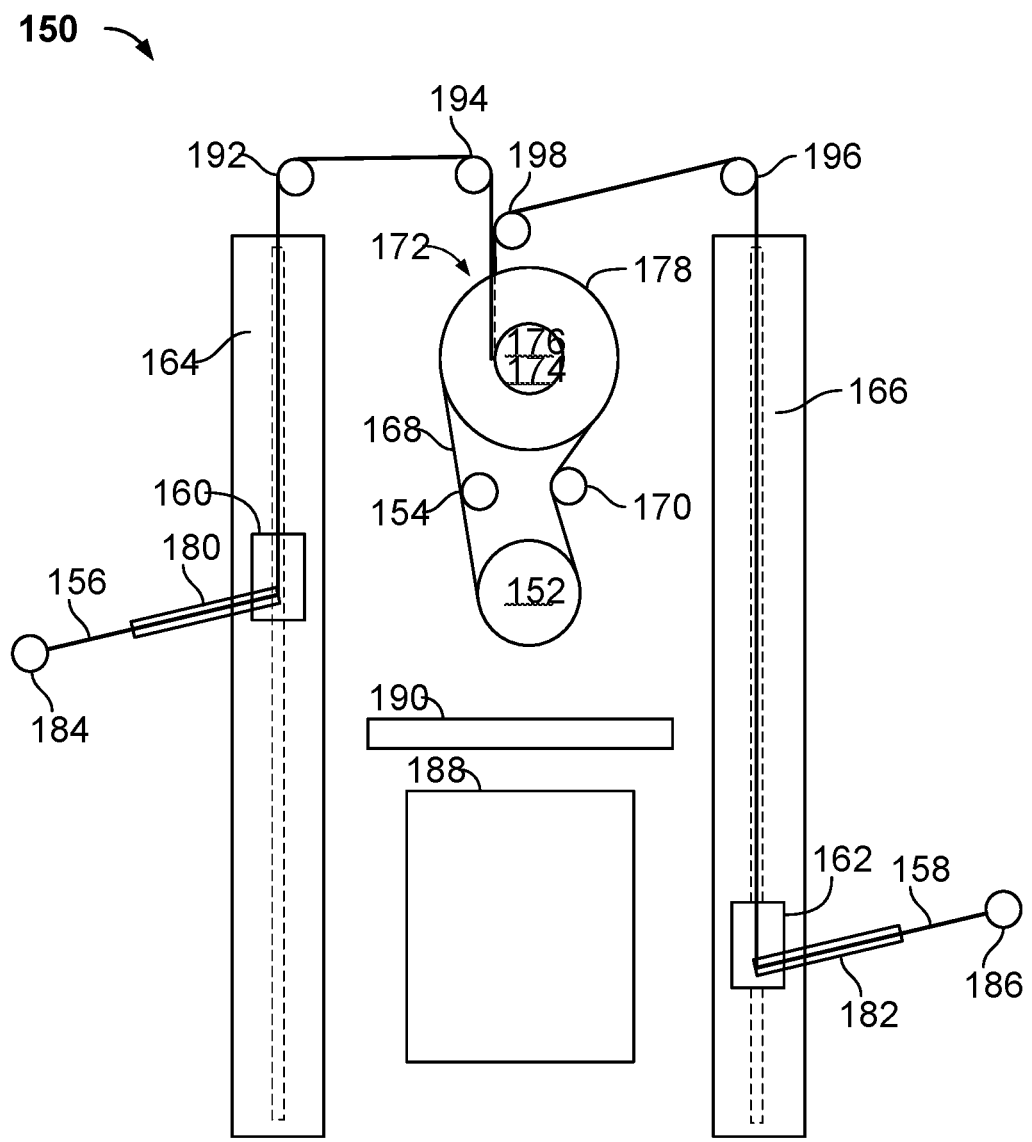
FIG. 1B illustrates a front view of one embodiment of an exercise machine.

FIG. 1B illustrates a front view of one embodiment of an exercise machine. In some embodiments, exercise machine 150 of FIG. 1B is an example or alternate view of the exercise machine 102 of FIG. 1A. In this example, exercise machine (150) includes a pancake motor (152), a torque controller coupled to the pancake motor, and a high resolution encoder (154) coupled to the pancake motor. As used herein, a "high resolution" encoder refers to an encoder with 30 degrees or greater of electrical angle. In this example, two cables (156) and (158) are coupled respectively to actuators (184) and (186) on one end of the cables. Examples of actuators include handles, bars, etc.) The two cables (156)

and (158) are coupled directly or indirectly on the opposite end to the motor (152). While an induction motor may be used for motor (152), a BLDC motor may also be used for its cost, size, weight, and performance. In some embodiments, a high resolution encoder assists the system to determine the position of the BLDC motor to control torque. While an example involving a single motor is shown, the exercise machine may include other configurations of motors, such as dual motors, with each cable coupled to a respective motor.

In some embodiments, the motor is driven by a motor controller circuit, which in some embodiments includes a processor, inverter, pulse-width-modulator, and/or a Variable Frequency Drive (VFD). In some embodiments, a filter is configured to digitally control the controller circuit based on receiving information from the cable and/or actuator.

Sliders (160) and (162) may be respectively used to guide the cable (156) and (158) respectively along rails (164) and (166). The exercise machine in FIG. 1B translates motor torque into cable tension. As a user pulls on actuators (184) and/or (186), the machine creates/maintains tension on cable (156) and/or (158). The actuators (184, 186) and/or cables (156, 158) may be actuated in tandem or independently of one another.

In one embodiment, electronics bay (188) is included and has the necessary electronics to drive the system. In one embodiment, fan tray (190) is included and has fans that cool the electronics bay (188) and/or motor (152).

Motor (152) is coupled by belt (168) to an encoder (154), an optional belt tensioner (170), and a spool assembly (172). In one embodiment, motor (152) is an out-runner, such that the shaft is fixed and the motor body rotates around that shaft. In one embodiment, motor (152) generates torque in the counter-clockwise direction facing the machine, as in the example in FIG. 1B. Motor (152) has teeth compatible with the belt integrated into the body of the motor along the outer circumference. Referencing an orientation viewing the front of the system, the left side of the belt (168) is under tension, while the right side of the belt is slack. The belt tensioner (170) takes up any slack in the belt. An optical rotary encoder (154) coupled to the tensioned side of the belt (168) captures all motor movement, with significant accuracy because of the belt tension. In one embodiment, the optical rotary encoder (154) is a high-resolution encoder. In one embodiment, a toothed belt (168) is used to reduce belt slip. The spools rotate counter-clockwise as they are spooling cable/taking cable in, and clockwise as they are unspooling/releasing cable out.

The encoders described above are examples of sensors of the exercise machine. In various embodiments, encoders are used to measure cable lengths (e.g., left and right cable lengths in this example), cable speeds, weight (tension), etc.

One example of an encoder is a position encoder; a sensor to measure position of the actuator or motor. Examples of position encoders include a hall effect shaft encoder, greycode encoder on the motor/spool/cable, an accelerometer in the actuator/handle, optical sensors, position measurement sensors/methods built directly into the motor, and/or optical encoders. In one embodiment, an optical encoder is used with an encoding pattern that uses phase to determine direction associated with the low resolution encoder. As another example, a magnetic encoder is used to determine cable position/length. Other mechanisms that measure back-EMF (back electromagnetic force) from the motor in order to calculate position may also be used;

a motor power sensor; a sensor to measure voltage and/or current being consumed by the motor;

a user tension sensor; a torque/tension/strain sensor and/or gauge to measure how much tension/force is being applied to the actuator by the user. In one embodiment, a tension sensor is built into the cable. Alternatively, a strain gauge is built into the motor mount holding the motor. As the user pulls on the actuator, this translates into strain on the motor mount which is measured using a strain gauge in a Wheatstone bridge configuration. In another embodiment, the cable is guided through a pulley coupled to a load cell. In another embodiment, a belt coupling the motor and cable spool or gearbox is guided through a pulley coupled to a load cell. In another embodiment, the resistance generated by the motor is characterized based on the voltage, current, or frequency input to the motor.

Spool assembly (172) comprises a front spool (174), rear spool (176), and belt sprocket (178). The spool assembly (172) couples the belt (168) to the belt sprocket (178), and couples the two cables (156) and (158) respectively with spools (176) and (174). Each of these components is part of a low profile design. In one embodiment, a dual motor configuration not shown in FIG. 1B is used to drive each cable (156) and (158). In the example shown in FIG. 1B, a single motor (152) is used as a single source of tension, with a plurality of gears configured as a differential are used to allow the two cables/actuators to be operated independently or in tandem. In one embodiment, spools (176) and (174) are directly adjacent to sprocket (178), thereby minimizing the profile of the machine in FIG. 1B.

As shown in FIG. 1B, two arms (180, 182), two cables (156, 158) and two spools (176, 174) are useful for users with two hands, and the principles disclosed without limitation may be extended to three, four, or more arms (180) for quadrupeds and/or group exercise. In one embodiment, the plurality of cables (156, 158) and spools (176, 174) are driven by one sprocket (178), one belt (168), and one motor (152), and so the machine (150) combines the pairs of devices associated with each user hand into a single device. In other embodiments, each arm is associated with its own motor and spool.

In one embodiment, motor (152) provides constant tension on cables (156) and (158) despite the fact that each of cables (156) and (158) may move at different speeds. For example, some physical exercises may require use of only one cable at a time. For another example, a user may be stronger on one side of their body than another side, causing differential speed of movement between cables (156) and (158). In one embodiment, a device combining dual cables (156) and (158) for a single belt (168) and sprocket (178) retains a low profile, in order to maintain the compact nature of the machine, which can be mounted on a wall.

In one embodiment, pancake style motor(s) (152), sprocket(s) (178), and spools (176, 174) are manufactured and arranged in such a way that they physically fit together within the same space, thereby maximizing functionality while maintaining a low profile.

As shown in FIG. 1B, spools (176) and (174) are respectively coupled to cables (156) and (158) that are wrapped around the spools. The cables (156) and (158) route through the system to actuators (184) and (186), respectively.

The cables (156) and (158) are respectively positioned in part by the use of "arms" (180) and (182). The arms (180) and (182) provide a framework for which pulleys and/or pivot points may be positioned. The base of arm (180) is at arm slider (160) and the base of arm (182) is at arm slider (162). In some embodiments, each arm is configurable to be translated vertically, up and down a rail/track via its arm slider, which may be locked in various positions. In some embodiments, each arm is configurable to pivot vertically. In some embodiments, each rail/track is rotatable, thereby allowing the arms to be configured to pivot horizontally as well.

The cable (156) for a left arm (180) is attached at one end to actuator (184). The cable routes via arm slider (160) where it engages a pulley as it changes direction, then routes along the axis of rotation of track (164). At the top of rail/track (164), fixed to the frame rather than the track, is pulley (192) that orients the cable in the direction of pulley (194), that further orients the cable (156) in the direction of spool (176), wherein the cable (156) is wound around spool (176) and attached to spool (176) at the other end.

Similarly, the cable (158) for a right arm (182) is attached at one end to actuator (186). The cable (158) routes via slider (162) where it engages a pulley as it changes direction, then routes along the axis of rotation of rail/track (166). At the top of the rail/track (166), fixed to the frame rather than the track is pulley (196) that orients the cable in the direction of pulley (198), that further orients the cable in the direction of spool (174), wherein the cable (158) is wound around spool (174) and attached to spool (174) at the other end.

One use of pulleys (194, 198) is that they permit the respective cables (156, 158) to engage respective spools (176, 174) "straight on" rather than at an angle, wherein "straight on" references being within the plane perpendicular to the axis of rotation of the given spool. If the given cable were engaged at an angle, that cable may bunch up on one side of the given spool rather than being distributed evenly along the given spool.

In the example shown in FIG. 1B, pulley (198) is lower than pulley (194). This demonstrates the flexibility of routing cables. In one embodiment, mounting pulley (198) leaves clearance for certain design aesthetic elements that make the machine appear to be thinner.

As shown in the above examples, the exercise machine/appliance passes a load/resistance against the user via one or more lines/cables, to a grip(s) (examples of an actuator) that a user displaces to exercise. A grip may be positioned relative to the user using a load arm and the load path to the user may be steered using pulleys at the load arm ends, as described above. The load arm may be connected to a frame of the exercise machine using a carriage that moves within a track that may be affixed to the main part of the frame. In one embodiment, the frame is firmly attached to a rigid structure such as a wall. In some embodiments, the frame is not mounted directly to the wall. Instead, a wall bracket is first mounted to the wall, and the frame is attached to the wall bracket. In other embodiments, the exercise machine is mounted to the floor. The exercise machine may be mounted to both the floor and the wall for increased stability. In other embodiments, the exercise machine is a freestanding device.

In some embodiments, the exercise machine includes a media controller and/or processor, which monitors/measures user performance (for example, using the one or more sensors described above), and determines loads to be applied to the user's efforts in the resistance unit (e.g., motor described above). Without limitation, the media controller and processor may be separate control units or combined in a single package. In some embodiments, the controller is further coupled to a display/acoustic channel that allows instructional information to be presented to a user and with which the user interacts in a visual manner, which includes communication based on the eye such as video and/or text or icons, and/or an auditory manner, which includes communication based on the ear such as verbal speech, text-to-speech synthesis, and/or music. Collocated with an information channel is a data channel that passes control program information to the processor which generates, for example, exercise loading schedules. In some embodiments, the display is embedded or incorporated into the exercise machine, but need not be (e.g., the display or screen may be separate from the exercise machine, and may be part of a separate device such as a smartphone, tablet, laptop, etc. that may be communicatively coupled (e.g., either in a wired or wireless manner) to the exercise machine). In one embodiment, the display is a large format, surround screen representing a virtual reality/alternate reality environment to the user; a virtual reality and/or alternate reality presentation may also be made using a headset. The display may be oriented in landscape or portrait.

In one embodiment, the appliance media controller provides audio information that is related to the visual information from a program store/repository that may be coupled to external devices or transducers to provide the user with an auditory experience that matches the visual experience. Control instructions that set the operational parameters of the resistance unit for controlling the load or resistance for the user may be embedded with the user information so that the media package includes information usable by the controller to run the machine. In this way a user may choose an exercise regime and may be provided with cues, visual and auditory as appropriate, that allow, for example, the actions of a personal trainer to be emulated. The controller may further emulate the actions of a trainer using an expert system and thus exhibit artificial intelligence. The user may better form a relationship with the emulated coach or trainer, and this relationship may be encouraged by using emotional/mood cues whose effect may be quantified based on performance metrics gleaned from exercise records that track user performance in a feedback loop using, for example, the sensor(s) described above.

Returning to the example of FIG. 1A, in this example, the exercise machine 102 includes an interface 122 to communicate with external camera device 104. In some embodiments, the external camera device is wirelessly coupled to the exercise machine over, for example, a local WiFi network 106 (e.g., WiFi network in a user's home). In other embodiments, the external camera device is wired or tethered to the exercise trainer (e.g., using USB (universal serial bus) or any other interface, as appropriate). In this example, the external camera device is moveable, and the user may place it in various different positions for different viewpoints or perspectives. Examples of movable external camera devices include standalone camera devices, mobile phones with imaging capabilities, webcams, etc.

In various embodiments, the trainer includes an onboard camera, but need not. Using the framework described herein, various camera capture configurations may be implemented, such as onboard camera along with one or more external camera devices, external camera device only, multiple external cameras without an onboard camera, etc.

For example, in the case that the exercise machine does not include an onboard camera, the external camera device is the primary camera device. If the trainer does have an onboard camera, in some embodiments, the external camera device provides an additional feed that supplements or augments a video feed from an onboard camera. This allows multiple angles and camera views to be captured. For example, the onboard camera may be used to provide a front view, while the external camera device is positioned to capture a side view of the user. Different configurations may be used for different scenarios and applications.

For example, a front facing camera pointed at the user may be used for capturing video of a standing face pull exercise (where the user is bringing the rope from the top towards their face). However, for other moves, such as deadlifts or off-machine moves, other angles of the user are beneficial to have, and in these cases, an external camera is useful (e.g., to capture the portions of the body that the front facing camera would not, such as a side view or behind the user, to capture their back and/or lower body, etc.).

As another example, a front facing camera (either with an embedded onboard camera, or by placing the external camera in front of the user, or in a receptable on the trainer) is beneficial for performing repetition counting and determining body composition. A front facing camera is also beneficial for some types of form feedback, such as knee valgus. A side camera is beneficial for other moves such as squatting versus hinging on dead lifts.

One example of the external camera device is a mobile computing device (e.g., smart phone, tablet, etc.) that has a set of optical sensors or cameras (e.g., RGB cameras, depth sensing cameras, etc.). In this example case, the mobile device also has installed a companion mobile app that is used in conjunction with the exercise machine. In some embodiments, the app is used to facilitate linking or pairing between the mobile device and the exercise machine. As another example, the external camera device is a standalone camera device.

The following is an example of setting up the external camera device for use with the exercise machine. As one example, the trainer displays a visual marker such as a QR (Quick Response) code. The user uses the camera on their mobile device (e.g., via the mobile app on the user's phone, or software on a standalone external camera device) to scan the QR code. Various setup parameters, such as backend credentials, local WiFi settings (e.g., SSID and password), login information, etc. are shared via the QR code, which allows for example, a port to the trainer to be opened directly from the moveable external camera device. In this way, in which the external camera device opens a port to the trainer using setup parameters received via scanning of a QR code, friction in the setup experience is removed.

As another example of a setup, suppose that the user would like to use the camera on their mobile smart phone to capture video information to be used by the trainer. In this example, the mobile phone has installed a mobile app that is a companion to the trainer. The user logs into their mobile app with their account. In this example, the user's trainer is already registered or otherwise associated with their account. When the user logs into the mobile app, their trainer will be identified. In this example, the user selects, within the mobile app, the option to enable a vision/video capture feature. In response, a synchronization step is performed. If the mobile phone and the trainer are connected to the same WiFi network, then, in some embodiments, the mobile app scans the local network for the trainer and connects to it (e.g., using the information about the trainer that is associated with the user's account). If a standalone external camera device is used that is to be configured for the first time, the WiFi connection information may be obtained via scanning of a QR code (or via manual entry by the user), as described above.

Once connected with the exercise machine, in some embodiments, suggestions or recommendations on how to place or position the external camera device are provided via the mobile app and/or on a display of the exercise machine (e.g., to keep the moveable camera at least several feet away).

Figure 2:
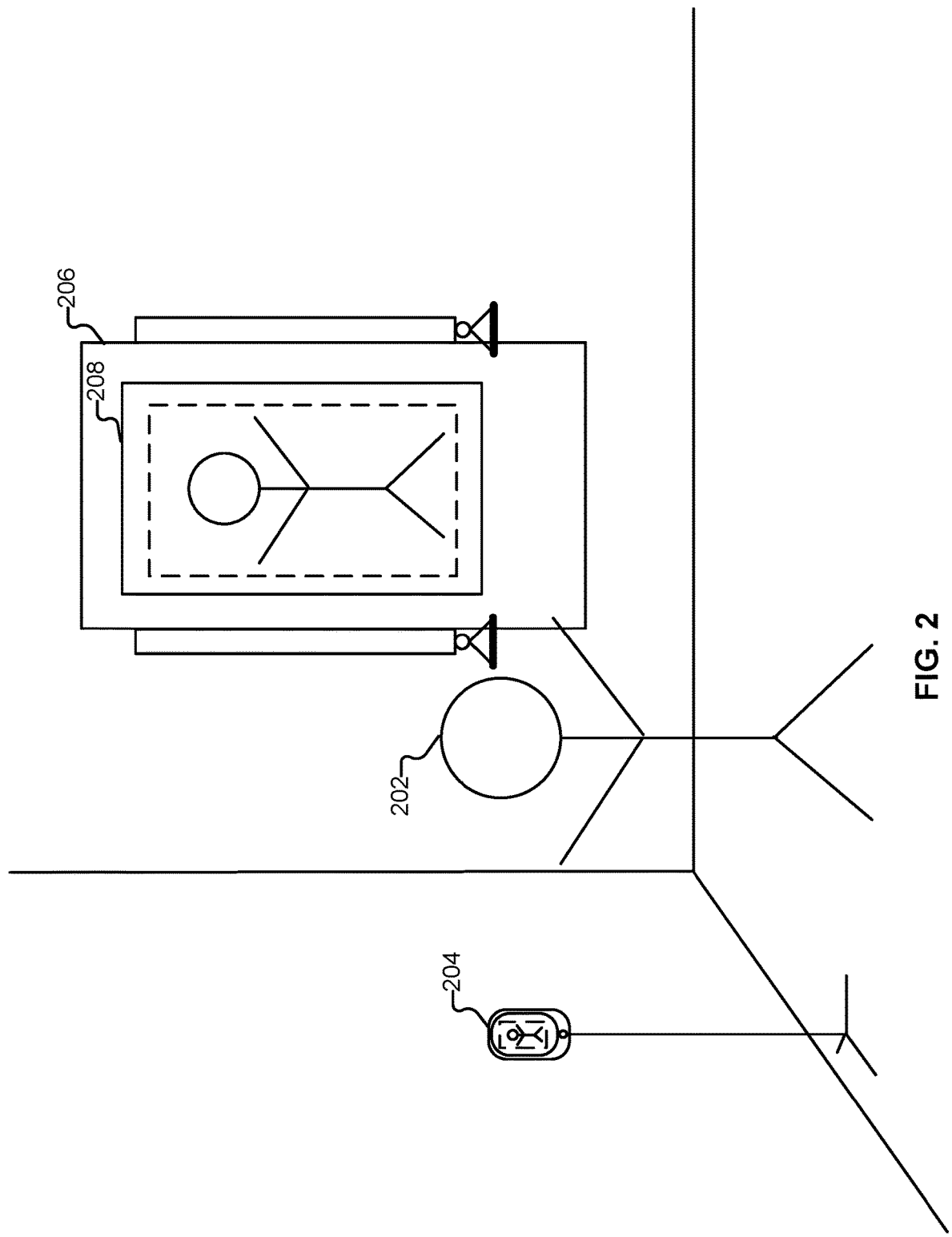
FIG. 2 illustrates an example of setting up an external moveable camera device with a trainer.

FIG. 2 illustrates an example of setting up an external moveable camera device with a trainer. The user 202 positions their camera 204, such as at a 90-degree angle relative to the strength trainer 206. In some embodiments, during this process, the moveable camera device is capturing a video stream that is sent to the trainer as part of a setup process. In some embodiments, the trainer is configured to display, on its screen 208, the video feed from the moveable camera device as it is being positioned during setup (e.g., to mirror what is being observed by the moveable camera device). In some embodiments, the camera displays a visual indication to identify whether the camera has been positioned appropriately. For example, if all of the user's body parts are within the camera's field of view (an example of correct positioning), then a green rectangle is displayed (where the green rectangle may be shown on the mobile camera device (if it has a screen) and also on the trainer) so that the user can move themselves and/or the moveable camera device accordingly. If the user and/or camera are not appropriately positioned, a red rectangle may be shown. In some embodiments, a position of the external camera is recommended to the user (e.g., via the external camera device and/or the exercise machine), such as to the side with respect to the exercise machine. Other types of indications or feedback of correct/incorrect positioning of the external camera device may be provided (e.g., check marks, audio cues, text cues, etc.). Once set up, the user may then begin working out.

The following are further details and embodiments of setting up the external camera device (e.g., positioning the camera appropriately), such as additional embodiments of providing feedback to a user of how to position the moveable camera device that is external to the trainer. As one example, an image, such as a fixed image or QR code that has directionality (e.g., in depth) may be placed on the trainer. The camera is then placed to see that image (where, in some embodiments, a live feed of the camera is displayed as described above, allowing the user to see the live video to adjust the position of the external camera), which is then used to determine the position of the camera relative to the trainer. For example, the relationship between distance, angle, and or height between the external camera device and the trainer is determined. In some embodiments, the relative position of the camera to the trainer is one component of setting up the camera, which includes the aforementioned determination of whether the user is within the field of view of the external camera device. In this way, the relationship between the external camera device and the user, as well as the relationship between the external camera device and the strength trainer, are used in determining whether the camera is properly positioned.

Leveraging the imaging sensors of a standalone external moveable camera or a user's personal mobile device allows for acquisition of video data at scale, where such data may be used to perform various tasks, such as pose estimation, as input or training data to machine learning models to power computer vision features, etc. For example, with respect to form feedback, the integration with moveable camera devices and accessories allows for the collection of large volumes of data in a multitude of environments with various different types of good and bad form across different types of users.

There are further benefits to utilizing an external camera device. In addition to augmenting cable-based measurements with video data, other types of augmentation are also facilitated by the use of an external camera device. As described above, in some embodiments, the video information captured by the external camera device is used to perform pose estimation using computer vision. The cost of computer vision processing may be computationally expensive, and tax the hardware (e.g., computing power) of the trainer. In some embodiments, the computing is distributed across the trainer and the external camera device. For example, referring to the embodiment shown in FIG. 1A, the external camera device includes computation engine 120, which in various embodiments includes CPUs and/or GPUs for performing various types of processing, such as computer vision, machine learning, etc.

That is, computations based on the video information may be split between the external camera device and the trainer. For example, in some embodiments, the video information is processed on the external camera device, where it is transformed into a set of event data that is sent to the trainer for further processing (e.g., combining with the cable-based measurements collected via sensors on the exercise machine). In other embodiments, raw video data is sent to the trainer for processing. In other embodiments, a portion of the video information is sent to a backend or cloud entity 108 for processing. In some embodiments, the cloud computation is backend on which computation processing may be performed. Such a backend may be hosted on a cloud service provider such as Amazon Web Services (AWS), Google Cloud, or any other infrastructure, as appropriate. In this example, the exercise machine and/or external camera device communicate with the cloud computation entity over a network such as the Internet 110. That is, portions of the processing of the raw video data captured by the external camera device may be performed in different locations (external camera device, exercise machine, and/or cloud). Communication of information among the entities of the system may also be bi-directional. As one example, the trainer sends data to the external camera device to perform real time processing. The trainer may also receive information from the external camera device to determine feedback. In some embodiments, to generate a post-workout summary, the trainer and/or external camera device transmit data to the cloud, where the cloud generates the summary and serves it for post workout analysis. Further details regarding routing of information within the architecture described herein (e.g., among the external camera device, trainer, and the cloud as different compute locations or sources of compute) to effectively run various types of processing and computations are described below.

In this example, vision-based data is received via camera data engine 112 of exercise machine 102. In various embodiments, vision or imaging-based information includes raw video data, RGB (Red Green Blue) data, LIDAR (laser imaging, detection, and ranging) data, etc. Vision-based information also includes information generated from captured raw data, such as key points from pose estimation, optical flow to capture motion, etc.

Cable-based measurements are received via cable measurement engine 114 of trainer 102. In some embodiments, the cable-based measurements (e.g., cable lengths, cable speeds, weight (tension), etc.) are obtained using the various sensors, such as the encoders described above.

Synchronization engine 116 is configured to map video information based on the data received from the external camera device with cable-based measurements. In some embodiments, the synchronization is performed via time stamps. After synchronization, the corresponding portions of the vision-based and cable-based data are combined. Further details regarding synchronization are described below.

Workout determination engine 118 is configured to perform a workout determination based at least in part on both the imaging-based information and the cable-based measurements. In the context of form feedback, in some embodiments, the workout determination engine is configured to determine feedback based on detected incorrect form. Feedback may be provided to a user in a variety of ways. In various embodiments, feedback is presented on the display of the exercise machine, via auditory cues, etc. As one example, a video stream from the external camera device is displayed on the trainer, where the portion of the body that has incorrect form is highlighted. As another example, a feed of the user is displayed side by side with the coach, allowing the user to self-correct. As another example, text notes are displayed on the screen.

The following is an example of utilizing the architecture of FIG. 1A to facilitate form feedback. In this example, the exercise trainer is coupled with a mobile phone (an example of external camera device 104) that has a camera. In this example, the phone camera is used to capture video of the user performing an exercise. In some embodiments, the mobile device is configured to perform pose estimation from the captured video (e.g., using computation engine 120). This includes generating, using the local computational and processing power of the mobile device, key points. In this example, the mobile device periodically transmits the generated key points to the trainer. The key points generated using computer vision represent various points on the user's body, such as their joints (e.g., elbow, shoulder, hips, knees, etc.), where connecting the key points would result in a "stick figure" model of the user.

In this example, the trainer uses the key points received from the mobile camera device as input to a machine learning model that runs on the trainer (e.g., such as in a processing sandbox). The imaging or vision-based information (key points) is combined with the cable-based measurements (e.g., after being synchronized by synchronization engine 116) to perform a determination of whether correct or incorrect form has been detected (e.g., by workout determination engine 118). In some embodiments, the cloud entity is also accessed, for example, to obtain model parameters for determining form feedback.

In this example, the interaction among the various entities in the architecture is in real-time. For example, pose estimation occurs live, as video is being processed. As described in this example, rather than the raw video feed being sent directly to the exercise machine, some processing is performed on the mobile camera device (and thus the processing of the captured video is distributed across multiple entities).

For example, suppose that a user is doing a squat, and has placed their moveable camera device to their side, at an angle from which the user is visible (e.g., using the setup process described above), and allowing the side of their body to be captured. From the captured video, the moveable camera device generates a set of key points from captured video frames, a type of video-based event information. For example, the key points correspond to different points on the human user. For example, one key point is generated that corresponds to the user's face (e.g., their nose). Key points are also generated that correspond to the user's feet. Key points are also generated at joints identified in the video data, such as the wrist, knees, hips, elbows, etc. Each key point is associated with a set of coordinates, indicating the position of the key point (e.g., hip) in space at a point in time (e.g., when the frame was captured). Tracking of the position of key point over time/frames may be used to determine how a joint is moving over the course of a repetition.

The event information generated by the moveable camera device from the raw video information, such as the key points, are transmitted to the trainer for further processing (e.g., over WiFi or Bluetooth). In some embodiments, the key points generated at the external camera device are continuously sent to the trainer as they are generated. Processing of the key points is then performed at the trainer. In this example, the external camera device is configured to generate key points, and the trainer is configured to perform processing on the key points.

In some embodiments, the external camera device streams key points to the exercise machine as they are being generated from captured imaging data. In other embodiments, key points are batched together, and a batch of key points is sent to the trainer. A batch of key points may be sent periodically. As another example, key point information is transmitted at specific points, or in response to the occurrence of certain events, such as at the end of a specific phase (e.g., end of a concentric or eccentric phase). For example, the trainer, which is configured with logic to determine when phases of a rep occur (e.g., using cable-based measurements), collects the key point data by requesting, at the end of completion of a phase of a rep, the moveable camera device to provide a batch of key point data.

The batching provides various benefits. For example, the batching prevents performance issues. As one example challenge addressed by batching, sending key point information, as it is being generated, to a network interface on the trainer (where for example there may be a single network interface that is not only used for WiFi, but also other protocols such as Bluetooth) may result in high CPU utilization. Intelligently batching the frame-derived information at different workout phases (e.g., at the end of a concentric or eccentric phases) or at fixed points of communication to the trainer reduces the burden on the CPU, as compared to sending real-time, frame by frame information to the trainer.

In some embodiments, the batching is time-based. For example, given a workout, the average phase duration is determined. When a workout starts on a trainer, the timestamp of when the workout started is also sent to the external camera device, so that the external camera device is aware that a workout has started and that key points corresponding to reps should be generated. The timestamps of the average or expected phase durations are also transmitted (for example, a program or workout may be executed according to a fixed timeline, where certain events, such as warmup periods, transition periods between sets, etc. are scheduled to occur at known points in time relative to the start of the workout). In this way, the external camera device is also aware of when different events in a workout are to occur (e.g., when the user is performing an exercise on the trainer, when they are exercising off the trainer, etc.). In some embodiments, the trainer sends information to the external camera device indicating when certain workout events have occurred (or are expected to occur), which the external camera device then uses to determine when to transmit a batch of key point information (e.g., group together a batch of key points pertaining to a specific phase of a rep).

In the above example, the trainer sends an indication (e.g., timestamp) to the external camera device indicating when a workout has started (so that the external camera device is aware that the workout has started). As another example, if the trainer is in the field of view of the camera of the external camera device, then the trainer also indicates the start of the workout to the external camera device via a visual cue (or any other cue that is observable by the camera device) displayed on the screen of the trainer. As one example, the trainer is configured to cause the display to go blank when the workout starts. The external camera device is configured to monitor for such visual events, which may be mapped to different types of workout events, where in this case, in response to detecting the blanking of the screen, the external camera is now aware that the workout has started. In some embodiments, in addition to registering a timestamp for the start of a workout, or determining how and when to batch information, the visual cue may be used to indicate to the user that they are being recorded.

In some embodiments, the trainer also signals to the external camera device an indication that a workout has ended. In addition to the start and end of a workout, various other information may be transmitted from the trainer to the external camera device, such as when a certain milestone has been reached within a workout, when reps have started or ended, when a set has started or ended, etc. The moveable camera device then uses portions of such information to determine how and when to send video-based information to the exercise machine.

As described herein, the imaging or vision-based information includes data derived from video frames captured by the external camera device. However, there may be issues with frames, such as missing frames and bad frames. For example, when capturing frames or transmitting data, there may be issues with dropped frames or jerkiness, which in turn impacts the quality of the vision-based information. The following are embodiments of techniques for improving robustness of frame-based information.

As one example, smoothing is performed to address the issue of bad frames. In some embodiments, smoothing is performed by the trainer on the received key point data. For example, smoothing is performed to avoid detection of jerky behavior.

The following is an example of smoothing. In some embodiments, a set of key points is generated from a corresponding video frame. That set of key points is identified by an identifier of the video frame from which it was generated. In some embodiments, the key points transmitted to the trainer are also tagged with the identifier of the frame from which they were derived. In some embodiments, the trainer and/or external camera device maintains a rolling average of a window of frames (e.g., previous 10 frames). For example, the average values for key points (that correspond, for example, to joints) over the last ten frames are maintained. Different size windows and different aggregate values may be used.

In some embodiments, to address the issue of dropped frames, interpolation is performed. For example, as part of processing key points at the exercise machine, the exercise machine is configured to perform interpolation to generate missing points. For example, suppose that there is not key point data for frame T, but the trainer has received key points for frame T−1 and frame T+1. The trainer is configured to use the key point data from frame T−1 and frame T+1 to interpolate or generate synthetic key point data for frame T. As one example, an interpolated position of a joint (indicated by a key point value) at frame T is computed assuming that a rate of motion is constant between the frames T−1 and frames T+1.

In some embodiments, to prevent frame issues from negatively impacting the quality of workout determinations, vision-based information is discarded or otherwise unused if there are an insufficient number of frames worth of data.

For example, if a drop in WiFi occurs, this may result in key point data transmitted from the external camera device not arriving at the trainer. Suppose that form feedback is to be provided at the end of a rep, prior to the user progressing onto a next step. At the point at which the form feedback is to be determined, an amount of available vision-based, video frame-derived information is determined. For example, if the amount of available information is less than a threshold number of frames of data (e.g., ten frames worth of data), then all of the key point data corresponding to the rep that had just been completed is discarded. Other threshold numbers of frames may be used. For example, the threshold may be determined based on the frame rate or frames per second captured. As one example, suppose a fixed frame rate of 23 frames per second. A typical repetition is one to three seconds. If a threshold of 10 frames worth of data is used, then if this threshold is not met, this indicates that not even half of a second's worth of information was received for the repetition. In this case, the vision-based information is discarded and not used in performing a workout determination. Instead, for example, the trainer reverts to a default mode of using cable-based measurements independently of the vision-based data.

The exercise machine uses the (smoothed) batch of data to make a determination of whether correct or incorrect form is detected from the received batch of key points. In some embodiments, the determination is made prior to the starting of the next repetition. If incorrect form is detected, then an alert or notification is immediately triggered on the trainer in response. Other types of feedback on the user's form may be provided, as will be described in further detail below.

In this example, to make the workout determination of correct/incorrect form, the key point information received from the external camera device is combined with cable-based measurements collected via sensors during the performance of an exercise. For example, when performing the squat, the user uses the arms of the trainer to perform the squat, including performing the squat while holding the handles (examples of actuators) of the exercise machine, where, as they rise up, they are working against the resistance provided by the motor in the trainer (which is attempting to spool the cables back in). In various embodiments, the cable-based measurements are used to determine the number of repetitions performed, the user's range of motion, etc. In addition, the key points are also being received from the external camera device. For example, the external camera device transmits the key points to the trainer over WiFi using, for example, the webRTC protocol.

To determine form feedback for the squat being performed by the user (e.g., whether the user has correct or incorrect form for this rep of a squat that they are performing or have just performed), the vision-based measurements and the cable-based measurements are synchronized, combined, aligned, or otherwise associated with each other. For example, a portion of the key points in the received key points is mapped to a corresponding portion cable-based measurements that occurred at the same time.

As one example, timestamp-based synchronization is performed. For example, the key-points that are generated on the external camera device are timestamped. The cable-based measurements are also timestamped at the trainer according to a synchronized timing scheme (or, for example, an offset or difference between the time on the external camera device and the trainer is used to align vision and cable-based measurements). The key point samples and cable-based measurement samples with the same corresponding timestamp values (or are within a threshold amount of time) are matched together.

In the context of form feedback, in some embodiments, form detection is performed with respect to repetitions, in which case imaging-based information received outside of a repetition may be of less relevance in some cases. The following are embodiments of identifying a subset of relevant video-based information for evaluation. Using the techniques described herein, not only is synchronization facilitated, but key point generation can be limited to only relevant video frames (thereby saving resources by not needing to perform key point generation on non-relevant video frames). In some embodiments, for timestamp-based synchronization, signals indicating the start and/or end of a repetition are transmitted from the trainer to the external camera device, as described above. The start and/or end signals (which are also associated with corresponding timestamps) are used to identify cutoff timestamps. For example, the repetition-end signal is used to identify the start and end of what video data is evaluated or under consideration for a particular repetition. Further processing, such as pose estimation is then, for example, limited to that video data identified as being under consideration for a particular repetition.

The following is another example of synchronizing vision-based information from an external camera device with cable-based measurements collected at an exercise machine. The following example technique does not require timestamps, and may be used independently of, or in conjunction with, the timestamp-based synchronization described above.

For example, the alignment is performed by matching characteristics of the vision-based information (key points) with characteristics of the cable-based measurements. For example, the cable-based measurements are used to determine a maxima-minima of the cable motion. The key point data matching to the maxima and/or minima are used to determine a reference point for aligning key point data to the cable-based measurements. For example, in some embodiments, a key point includes 3D coordinate information (such as X-axis, Y-axis, and Z-axis coordinates) of where a point (e.g., hip, knee, elbow, wrist, etc.) on the person is at a particular point in time, which in some embodiments is identified by a corresponding frame identifier. For example, suppose that a user is performing a bench press, which is known to the trainer. The user, as part of performing the exercise, will cause the cable position to retract/extend in and out of the arm, which is reflected in the cable measurement data. The key points corresponding to the hands (or wrists) of the user, determined from the captured video data, will also show motion (change in position) corresponding to the extension/retraction. The change in the coordinates of position of key points is mapped to corresponding changes in position of the cable to synchronize the vision-based measurements with the cable-based measurements. In this way, the motion (changes in position) detected in the key point data is mapped with motion (changes in position) detected in the cable-based measurement.

As one example, the cable data (e.g., cable position data measured at the trainer) is transmitted to the external camera device, where the real-time cable information is maintained on the external camera device. The key points are generated from video frames captured by the external camera device. Corresponding subsets of the cable data and key points are used to match video frames to real-time cable data.

In other embodiments, the key points are sent to the exercise machine, where the exercise machine performs the above synchronization of vision-based and cable-based information. In some embodiments, the external camera device transmits the live video feed to the trainer. For example, the trainer displays the live video feed on the display of the trainer in a "mirror" mode, where the user can see themselves from the side view while performing the exercise. In some embodiments, the trainer performs matching of cable-based measurements to the frames in the live feed transmitted from the external camera device.

The exercise machine then performs a workout determination for an exercise (e.g., for a repetition being performed) using the vision-based and cable-based measurement data. For example, a prediction of whether correct or incorrect form has been detected is generated using a model (e.g., machine learning model and/or rule-based model). In some embodiments, rules are stored in a backend on a database, and retrieved by the exercise machine when a form feedback determination is to be made.

As one example, the cable-based measurements and vision-based information are used to detect form for different portions of the same exercise, where for example, the cable-based measurements and vision-based information are non-overlapping. For example, suppose the user is performing a Romanian deadlift exercise, where one hand is going downwards while holding onto the cable, and the other leg goes up. In this case, the cable information applies to the hand, and the imaging-based information applies to the foot. In this case, the vision-based information may be used to determine whether the user's form with respect to their foot is correct (e.g., at an appropriate height), and in turn provide feedback on whether they should lift their foot higher, lower their foot because it is too high, etc. As shown in this example, the manner in which cable-based information and vision-based information are combined or used to determine form feedback is movement-based, where different movements may combine the imaging-based information and cable-based information in different ways.

Over the course of a workout, workout determinations such as form feedback may be determined for different portions of the workout. In some embodiments, at the end of a workout, aggregate information about the sets in which incorrect form was detected is sent to the external camera device. If the external camera device is one that has a screen (such as a user's mobile phone), then video playback is performed to display video in which incorrect form was detected in the workout. For example, suppose the mobile device stores the recorded video frames captured during the workout. The form feedback information that is sent from the trainer back to the external camera device is tagged with frame identifier information indicating the set of frames in which incorrect form was detected (where the relevant frames are determined based on the key points used to determine the incorrect form, where the key points are derived from video frames identified by their corresponding frame identifiers). For example, if incorrect form has been detected (where the exercise machine and/or backend entity make the form prediction), the trainer also transmits a message to the moveable camera device that identifies the set in which incorrect form occurred. This is then synchronized with, for example, a mobile application on the mobile device, where video playback is stored, and where, in some embodiments, the video playback that corresponds to the incorrect form is stored or otherwise recognized, allowing that video segment corresponding to the incorrect form to be displayed in the mobile phone app. In some embodiments, video replays of the user's exercise are annotated with form feedback information. For example, the external camera device (e.g., mobile phone app) is configured to annotate the video replay with corresponding form feedback information (that is synchronized to the video, as described above). In other embodiments, the video data is sent from the external camera device to the exercise machine for playback on the exercise machine, where the exercise machine is configured to annotate the video data so that replays viewed on the display of the exercise machine are annotated. As another example, video is sent to the backend, where the backend performs the annotation. A user may then view a replay that is annotated for form feedback on their moveable camera device, exercise machine, or through a browser-based interface (e.g., when viewing through a browser on their desktop or laptop) by streaming or otherwise receiving the annotated replay from the backend.

Computation distribution using the architecture described herein provides flexibility, where different processing is capable of being performed at different locations (external camera device, exercise machine, and/or backend). As one example, the external camera sends the video feed to the trainer, where the trainer locally determines key points, synchronizes cable-based measurements with the vision-based information, etc. For example, suppose that the external camera device is a third party RTSP capable camera that is connected to the trainer. The camera sends a raw video stream to the trainer, where the trainer is configured to perform all of the form detection processing, including pose estimation using computer vision and machine learning models, locally on the trainer.

A hybridized model is also facilitated, where some processing is performed at the external camera device. For example, the generation of key points from video frames is offloaded to the external camera device (instead of being performed on the trainer), with the key points being transmitted to the trainer for further downstream use. In this way, the external camera device's computing capabilities (e.g., CPU, GPU, microcontrollers etc.) are leveraged to perform a portion of the form detection processing (e.g., the pose estimation and key point determination) by processing, on the external camera device, the video stream in real time. For example, in a mobile phone implementation, libraries inside of the mobile app installed on the mobile phone are used to perform the pose estimation.

The distribution or splitting of computation is adjustable. For example, over time, the distribution or splitting of computation may change. For example, in the case of the cameras of mobile phones being used with a trainer, one benefit of users bringing their own devices is that the computational power of mobile phones will continue to grow over time. While currently, a mobile phone may have the computation power to handle generating and streaming key points, the computation power may evolve over time to be sufficient to perform even more processing on the mobile device, allowing further offloading of computation from the trainer and/or the backend.

In some embodiments, the splitting of processing is also based on the time scale of the processing to be performed. For example, if a determination is to be made within a repetition or at the end of a set, the computation is configured to be performed on the external camera device and/or exercise machine. If the results of processing need not be available until after a workout has ended (in which the round trip time and time for processing is longer than a repetition), then such processing may be performed at the backend.

For example, there are various types of form feedback that can be generated, which pertain to different points of a workout. In some embodiments, where a computation is performed is determined based at least in part on when the form feedback is to be provided (e.g., during a rep, after a set, after a workout as a summary, etc.).

As described above, in various embodiments, the trainer is configured to perform workout determinations using vision-based information received from the external camera device in combination with cable-based measurements. In some cases, such as bad network connections, the vision-based information may be incomplete for the purposes of performing processing such as form detection.

In some embodiments, for robustness, if insufficient vision-based information is received at the exercise machine, then the vision-based information is discarded, ignored, or otherwise not used in determining form feedback (or any other type of workout determination, as appropriate). For example, form feedback is determined at the trainer using only the cable-based measurements collected locally at the trainer.

The following are additional embodiments of using a cable-based exercise machine in conjunction with a moveable camera device that is external to the exercise machine or trainer.

Off-Trainer Movements

In some embodiments, the camera is used to capture information about the user when they are performing movements off of the machine such as pushups, sit-ups, etc. (that is, where they are not using the cables, and there are no cable-based measurements to be collected). For example, the video stream captured by the external camera device is evaluated to count repetitions of off-trainer moves (e.g., by evaluating the change in position of collected key points).

Body Composition

As another example, vision-based information captured by the external camera is used to determine body composition. This includes physically determining a difference in body composition, such as in the size of biceps, lost weight in a waistline, etc. Such information may be used to provide validation back to a user.

In some embodiments, at least a portion of the processing for determining body composition is performed at the backend, as generating a 3D (three-dimensional) model of a person is computationally intensive. To determine body composition, at least two images of a person from different angles are captured. For example, the user is directed to position themselves so that a picture from the front is taken, and then the user is prompted to turn around so that an image of the user from a second view is taken. The images are then sent to the cloud (e.g., directly from the external camera device, or via the trainer), where the cloud extracts a dense set of key points from the images, resulting in key point information about the user from two different angles. In other embodiments, the key point generation is performed on the external camera device, and the key point information is sent to the cloud.

A machine learning model is executed at the backend that fits the user into a 3D (three dimensional) human model based on the key point information about the user from the two angles, information about the model, information about other humans that is accessed by the model, as well as information about the user themselves (e.g., their height and weight). For example, a 3D body figure of the user is produced. Individual measurements are then captured based on the generated 3D figure, such as measurements of arms, waist, etc. Then, based on gender and other information about the user (e.g., demographic information), approximate body composition information is calculated.

Injury Detection

As another example, the vision-based information captured by the external camera device is used to detect whether the user is injured. In some embodiments, in response to detecting a potential injury, the trainer assists the user by offsetting the resistance or weight they are countering, or otherwise reducing the user's workout load based on the detection of injury.

Form Evaluation

As another example, form evaluation is supported via the use of an external moveable camera device. For example, workouts (and virtual coaches) may be recorded from one angle, where users are then asked to place their cameras in specific locations such that when the virtual coach and the stream of the user are displayed together on the screen, the user's body is placed next to the coach's body for every movement. In this way, by showing the user next to the coach in the display as they are performing a movement, the user is able to directly see how their form compares to that of the coach's. This allows the user to see themselves in conjunction with the coach, in real time.

Generating a Highlight Reel of a Workout Reel

In some embodiments, the detected instances of incorrect form determined by the trainer are transmitted, along with the associated portions of the video stream in which the incorrect form was detected, to the backend. The backend entity is then configured to generate a highlight reel or summary of the person's workout by stitching together a compilation of video clips (e.g., set of video frames) of the instances in which incorrect form was detected.

Gesture and Object Detection

The vision-based information may be used to detect various types of events. For example, gestures are determined using key point information. As another example, the imaging-based information is evaluated using computer vision to determine obstacles in the surroundings of the user. The trainer is then controlled based on the determined obstacles. For example, if the camera device detects a person coming up behind the user in an unsafe way, the trainer automatically reduces resistance/weight in response.

Video Manipulation

In some embodiments, if the external camera device is equipped with a sufficient amount of computational power, the external camera device is configured to perform video manipulation. As one example, in a form feedback context, a visual representation of the user is created from key points generated at the external camera device. The visual representation is included in the video stream, where highlighting of areas with incorrect feedback (e.g., annotation as described above) is added as an overlay on top of the video stream. For example, suppose that incorrect form is determined. The video stream is manipulated to include a visual representation of the user in which the portion of their body with incorrect form is highlighted red. In some embodiments, the portion of the body representation to highlight is determined by identifying the subset of key points that correspond to where the incorrect form was detected. As the representation of the user is generated from key points, the region on the representation that corresponds to the subset of key points associated with the incorrect form is identified and highlighted in the video stream.

Other examples of manipulation of the video stream include increasing the gain on images, removing objects, saturating a sensor, performing further processing on the key point data (e.g., beyond generating the key points at the external camera device).

False Positive Reduction

The use of cable-measurement based data in conjunction with vision-based information is beneficial for reducing false positives in some models. For example, in some embodiments, the cable-based measurements are used to determine whether or not a user has started a rep (repetition). If a prediction based on vision-based information is generated, but it is determined based on the cable-based measurements that the user has not started a rep, then the prediction is determined to be a noisy prediction that is ignored or discarded.

Post Action Reporting

In some embodiments, the trainer is configured to perform real-time computations at the time scale of repetitions. In some embodiments, the backend is used to perform processing that need not be performed as repetitions are occurring, and that can be ready by the end of a workout, such as generating highlights, generating a workout reel, generating a post action report or summarization, etc. As one example of post workout analysis, the backend service evaluates data across sets and repetitions to determine aggregate metrics, such as the variability in leg position across three sets of performing a Romanian dead lift. If a video feed is available to the cloud service, the cloud service may also evaluate each rep across the entire workout. In some embodiments, the external camera device is configured to transmit video data directly to the cloud service (if, for example, the user has opted into allowing the cloud service to collect their video data).

Figure 3:
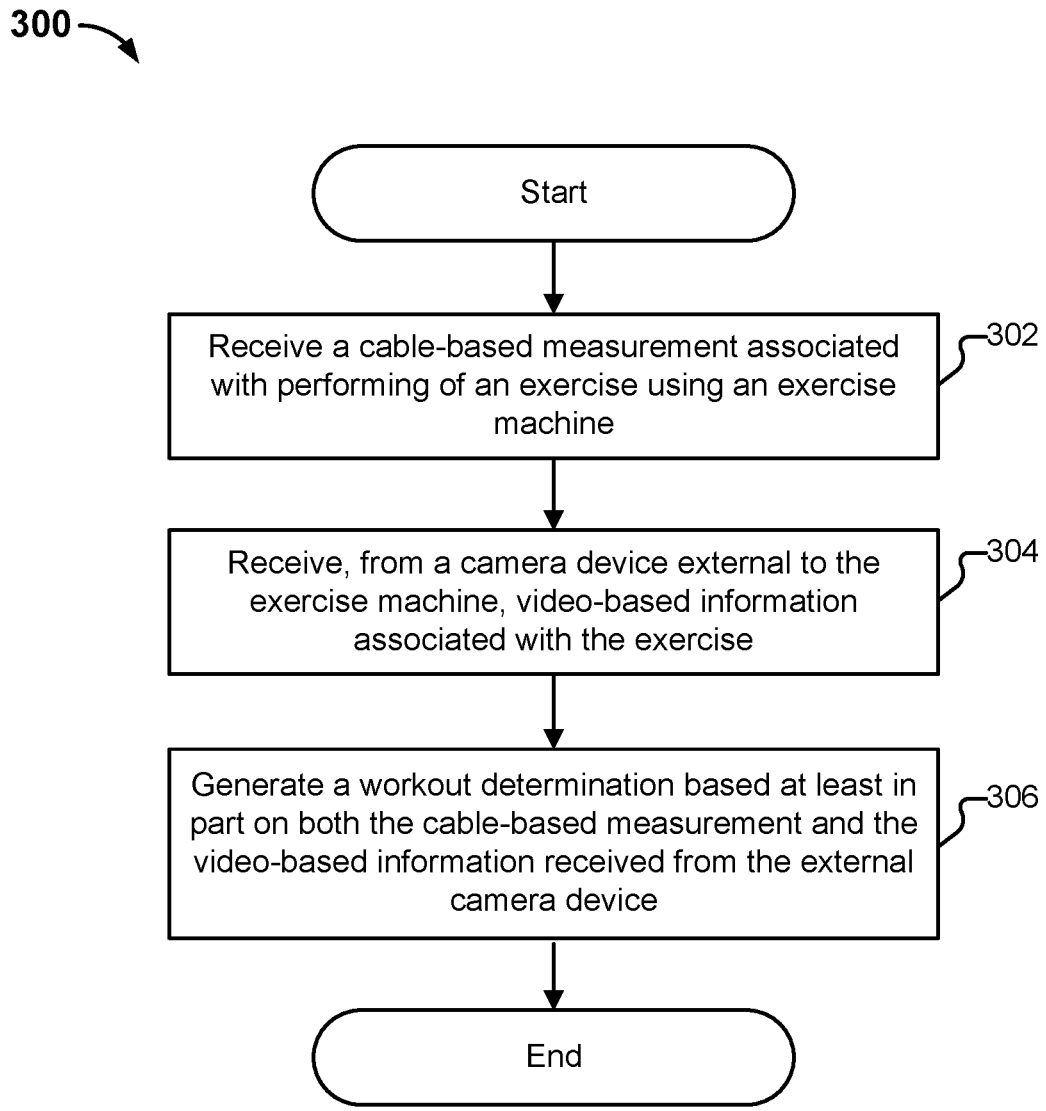
FIG. 3 is a flow diagram illustrating an embodiment of a process for generating a workout determination.

FIG. 3 is a flow diagram illustrating an embodiment of a process for generating a workout determination. In some embodiments, process 300 is executed by exercise machine 102 of FIG. 1A. The process begins at 302, when a cable-based measurement associated with performing of an exercise using an exercise machine is received. At 304, video-based information associated with the exercise is received from a moveable camera device external to the exercise machine. At 306, a workout determination is generated based at least in part on both the cable-based measurement and the video-based information received from the external camera device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An exercise machine, comprising:
   a cable;
   a motor coupled to the cable to provide resistance during an exercise performed by a user;
   an interface to an external camera device coupled with the exercise machine; and
   one or more processors configured to:
      receive cable-based measurements associated with the exercise performed by the user, wherein the cable-based measurements are is based at least in part on cable position data associated with the cable coupled to the motor, and wherein the cable position data is measured at least in part by a position encoder
      receive, from the external camera device, key points generated by the external camera device from captured video frames video information-associated with the exercise, wherein the key points correspond to one or more points of the user, wherein the key points are associated with timestamps, and wherein at least one of the external camera device or the exercise machine is configured to perform interpolation to generate a synthetic key point;
      map a portion of the received key points to a corresponding portion of the cable-based measurements at least in part by performing synchronization using the timestamps associated with the received key points; and
      provide a workout determination based at least in part on the mapping of the portion of the received key points to the corresponding portion of the cable-based measurements.

2. The exercise machine of claim 1, wherein the key points are batched together by the external camera device.

3. The exercise machine of claim 2, wherein the batch of key points is transmitted by the external camera device based at least in part on a phase of an exercise repetition being performed.

4. The exercise machine of claim 1, wherein the external camera device is wired to, or wirelessly coupled with, the exercise machine.

5. The exercise machine of claim 1, wherein at least one of the external camera device or the exercise machine is configured to perform smoothing of the key points at least in part by aggregating a window of video frames.

6. The exercise machine of claim 1, wherein the exercise machine is configured to provide to the external camera device an indication of a start of the exercise.

7. The exercise machine of claim 1, wherein the external camera device comprises a mobile phone, and wherein the mobile phone comprises a mobile application.

8. The exercise machine of claim 1, wherein the one or more processors are configured to determine whether an amount of the key points is below a threshold.

9. The exercise machine of claim 1, wherein the workout determination comprises at least one of form feedback, rep counting, range of motion (ROM), flexibility, struggle detection, or fatigue detection.

* * * * *